May 9, 1961 B. B. JOHANNSEN 2,983,321
SPRING TOOTH HARROW
Filed May 1, 1958 2 Sheets-Sheet 1

INVENTOR.
BRUNO B. JOHANNSEN
BY
ATTORNEYS

May 9, 1961  B. B. JOHANNSEN  2,983,321
SPRING TOOTH HARROW
Filed May 1, 1958  2 Sheets-Sheet 2
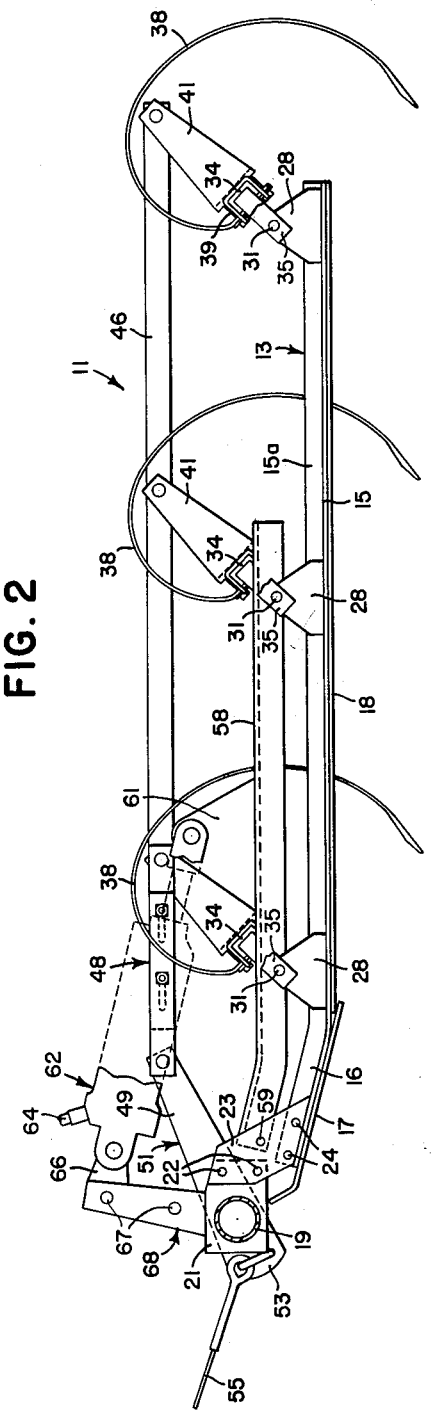
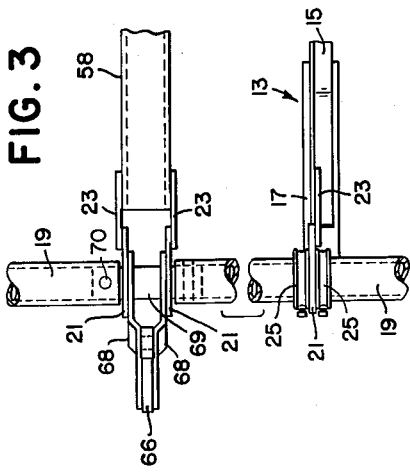
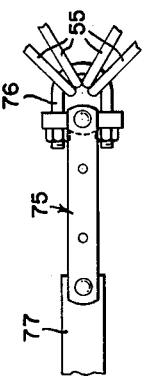
INVENTOR.
BRUNO B. JOHANNSEN
BY
C. T. Parker + R. C. Johnson
ATTORNEYS

United States Patent Office 2,983,321
Patented May 9, 1961

2,983,321

SPRING TOOTH HARROW

Bruno B. Johannsen, Moline, Ill., assignor, by mesne assignments, to Deere & Company, a corporation of Delaware Filed May 1, 1958, Ser. No. 732,204

10 Claims. (Cl. 172—390)

The present invention relates generally to farm implements and particularly to implements of the tractor drawn type in which ground working means is controlled from the tractor.

The object and general nature of this invention is a provision of an implement, such as a spring tooth harrow, in which means is provided for controlling the position of the ground working elements so as to provide for substantially uniform operation, even under the conditions of heavy draft, such as may result from difficult soil conditions, for example.

In implements, such as spring tooth harrows, where the reaction of the soil pressure against the teeth is transmitted through adjusting connections or the like to a swingable hitch or structure or to means carried thereon, difficult operating conditions sometimes cause such heavy draft that there is a tendency for the harrow to raise or hump up at the center, resulting in inadequate penetration of the front tools and inadequate and or unsatisfactory working of the soil. It is therefore a feature of this invention to provide a spring tooth harrow with draft-transmitting and tooth-adjusting connections so constructed and arranged that the draft is transmitted between the tractor and the harrow in such a way as to hold the front teeth as well as the rear teeth in their working position. Further, it is an important feature of this invention to entirely eliminate the support of any tooth angling means on any vertically swingable hitch means at the forward portion of the harrow. Instead, according to this invention, all or substantially all reactions due to soil pressure against the teeth are transmitted substantially directly to and confined within the frame of the harrow. Moreover, it is a feature of this invention to so connect the draft transmitting means, which may be simple cables or the like, to the harrow frame so as to reduce or minimize the aforesaid humping tendency, thus providing a construction in which difficult soil and heavy draft conditions are adequately taken care of while at the same time securing uniform action of the harrow teeth.

These and other objects and advantages of this invention will be apparent to those skilled in the art after reconsideration of the following detailed description, taken in conjunction with the following drawings, in which:

Fig. 2 is a generally central sectional view showing the mounting and arrangement of the power operated angle-controlling mechanism.

Fig. 3 is a fragmentary plan view of the cylinder-receiving portion of the structure shown in Fig. 2.

Fig. 4 is a fragmentary plan view of the cable-receiving hitch means.

Figure 1:
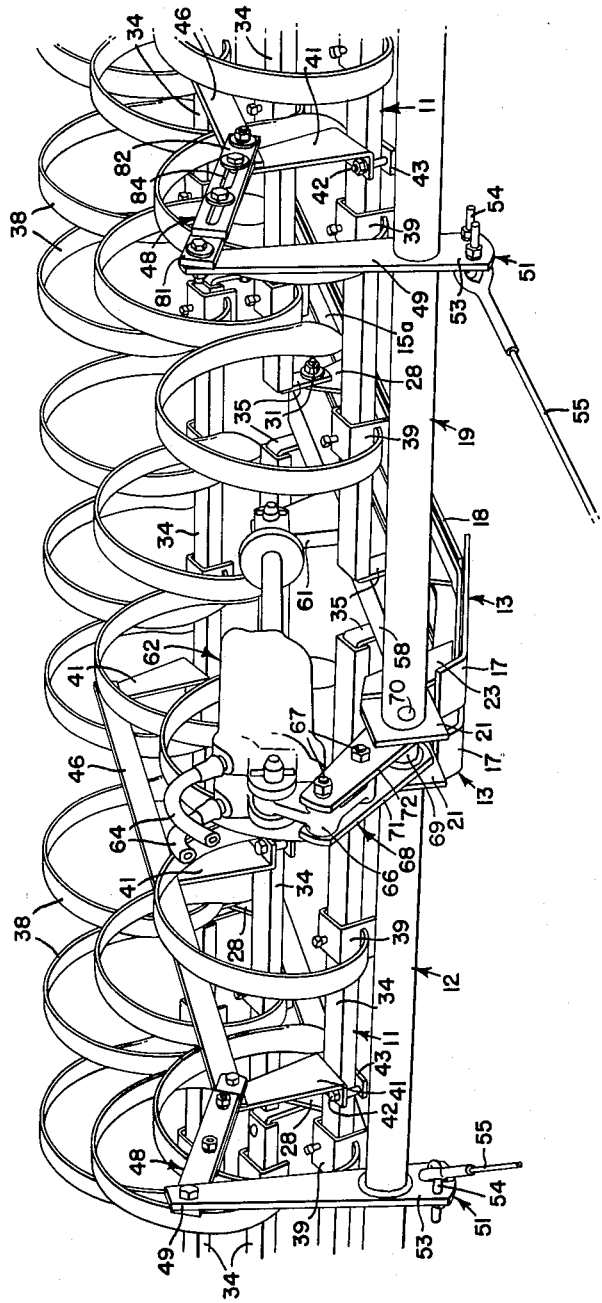
Fig. 1 is a fragmentary perspective view of the central portion of a four-section spring tooth harrow in which the principles of the present invention have been incorporated.

Referring first to Fig. 1, the spring tooth harrow in which the principles of the present invention have been incorporated is of the multiple section remote cylinder controlled type. As shown in Fig. 1, the harrow is made up of a plurality of sections 11 that are mounted on or connected with harrow frame means indicated in its entirety by the reference numeral 12. Each of the harrow sections includes a pair of generally fore-and-aft extending runner bars 13. The runner bars are generally of conventional construction each including a fore-and-aft extending angle 15, the forward end 16 of which is turned upwardly to receive a front upwardly angled wear shoe 17. Rearwardly of the latter the lower flange of the runner angle 15 receives a fore-and-aft extending wear strip 18.

The main frame means 12 includes, as a principal part thereof, a rigid transversely extending rockable part 19, preferably in the form of a pipe member that extends through vertical brackets 21 that are connected, as by bolts 22, to plates 23 that are bolted, as at 24, to the associated upwardly extending runner portion 16. Pairs of set screw collars 25 are fixed to the rockable bar 19 at opposite sides of each of the laterally outer runner bar brackets 21 (Fig. 3) so as to retain the runner bars on the transverse bar 19 in proper position one with respect to the other. Centrally, the two runner bars 13 are closely adjacent one another, as shown in Fig. 1.

The vertical flange 15a of each one of the runner bar angles 15 is apertured at a plurality of points to receive fasteners fixing a plurality of tooth bar pivot brackets 28 to each runner bar 13. These brackets 28 are apertured to receive pivots 31 by which associated transversely disposed tooth bars 34 are swingably connected with the brackets 28. Each tooth bar 34 is provided with down turned end sections 35 receiving the associated pivots 31. Each end section 35 is bolted to the tooth bar 34 of which, in effect, the end sections 35 form a part. Conventional spring teeth 38 are fixed by the usual clamps 39 to the transverse tooth bars 34 in the number and spacing desired.

Also secured to each tooth bar 34 is an upwardly extending standard 41, the lower portion of each of which is turned laterally and apertured to receive clamping bolts 42 that when tightened cooperate with a clamping plate 43 to secure each standard 41 in position. The several standards 41 fixed to each set of the tooth bars 34 are interconnected by a fore-and-aft extending link member 46, movement of the teeth between operating and transport position being controlled by shifting the link 46 in a generally fore-and-aft direction. The connections between the links 46 and the associated standards 41 are such that the standards 41 are maintained in parallelism in a generally upward direction.

According to this invention, the several fore-and-aft extending angle-controlling links 46 are suitably interconnected with the transverse rockshaft 19, and the latter is rocked to different positions, depending upon the position or angle of the teeth desired. For this purpose, a forward link 48 is connected between the forward end of each link 46 and an upwardly extending arm 49 that is fixed in generally fore-and-aft alinement with the associated tooth bar arms or standards 41. Each upwardly extending arm 49 forms the upper portion of a generally vertical plate 51 that is apertured so as to be passed over and welded or otherwise firmly fixed to the rockable pipe member 19. Each plate 51 extends a short distance below the pipe member 19 so as to form lower draft-receiving arms 53 that are apertured so as to receive hitch clips 54 which may be in the form of U-bolts or any suitable means by which hitch cables 55 may be connected thereto.

The means provided for rocking the member 19 in one direction or the other relative to the runner bars 13 will now be described. It will be seen from Fig. 1 that the two center runner bars 13 are disposed closely adjacent one another and the associated plates 23, to which the center brackets 21 are fixed, are spaced to receive a generally fore-and-aft extending channel member 58 therebetween. The member 58 lies above the pair of center runner bars 13 and extends rearwardly beyond the second tooth bar 34 as shown in Fig. 2. Preferably, the flanges of the channel member 58 are apertured to receive the associated tooth bar pivots 31. Also, the plates 23 and the forward ends of the flanges of the center channel 58 are apertured to receive bolts 59 or other fasteners.

A cylinder-receiving bracket 61 is fixed to the generally central portion of the channel member 58 and extends upwardly therefrom. The bracket 61 is adapted to receive a power unit in the form of a hydraulic cylinder 62 that derives operating pressure from the tractor through a pair of hose lines 64. The power unit 62 is of conventional construction and has its forward end pivotally connected to bracket means 66 that is fixed, as by bolts 67 or the like, to an arm 68 that at its lower portions is welded or otherwise firmly fixed to a stub shaft 69 that is pinned, as at 70, to the adjacent ends of the two pipes making up the pipe member 19. The arm 68 lies between the associated runner bar brackets 21. The arm 68 preferably is in the form of a pair of plates 71 and 72 spaced apart to receive and be connected to the bracket 66 that also forms a part of the arm 68.

As best shown in Fig. 4, the cables 55 are connected to a clevis member 75 by means of a U-bolt connector 76, and the member 75 is connected to the draw bar 77 of a conventional farm tractor whenever the harrow is to be placed in operation, the tractor being of the type in which operating pressure is available for operating the power unit 62.

As best shown in Fig. 1, the link 48 is made up of two overlapping parts 81 and 82, each slotted, and the parts 81 and 82 are adjustably interconnected by bolt and slot means 84.

The operation of the spring tooth harrow of this invention will best be understood from Fig. 2, which shows the harrow teeth 38 in operating position. The tractor supplies propelling force through the cables 55 to the several arm means 53 that are disposed in depending relation on the transverse rockshaft 19, whereby the draft pull tends to rock the rockshaft 19 in a clockwise direction as viewed in Fig. 2, and this reaction is transmitted through the links 48 and the standards 41 to the tooth bars 34 so as to tend to turn to rock the latter in a clockwise direction and thus oppose or counteract the effect of soil pressure against the lower or operating ends of the spring teeth 38. The power unit 62 is connected between the arm 68 on the rockshaft 19 and the stationary bracket 61 on the frame channel 58 so that the position of the teeth may be varied or changed as desired by operating the unit 62 to extend or retract the same, the unit 62 being of the hydraulically operated type wherein the parts are locked hydraulically against relative displacement. Thus, the unit 62 prevents any actual displacement of the tooth bars 34 but nevertheless the reaction of the draft pull opposes and counteracts the effect of the soil pressure acting against the teeth, with the result that, first, the unit 62 is relieved of at least a major portion of the forces involved in holding the teeth to their work, inasmuch as the reaction of the draft pull transmitted to the depending arm members 53 serves to effectively complement the unit 62, and second, all these reactions are, in effect, confined within the frame of the harrow so that notwithstanding the presence of these reactions, none of them is transmitted to any part that might cause humping of the front portion of the harrow sections. If such humping up of the harrow were permitted it would actually reduce the penetration of the forward teeth and result in non-uniform ground working action by the harrow teeth. It is also an advantage, in holding the teeth 38 to their work, to have the draft hitch connected to the harrow at a low point so that the draft pull can be exerted substantially directly along lines extending from the tractor draw bar to the center of pressure of the soil reaction against the several harrow teeth.

Having described my invention, what I claim and desire to secure by Letters Patent is:

1. A spring tooth harrow comprising means serving as a frame, a plurality of interconnected generally transverse tooth bars swingably mounted on said frame means, spring teeth on said tooth bars and swingable relative to said frame means into and out of soil working position, a transverse rockshaft extending substantially from one side of said frame means to the other side thereof, means serving as a bell crank rockably mounted on said frame means and having a first arm means operatively connected with said tooth bars, a second arm means adapted to receive draft applying means, said first and second arm means being so angularly related that the draft pull tends to swing said tooth arms so as to move the associated spring teeth downwardly toward deeper ground penetration, and a third arm means rigidly interconnected with said first and second arm means, and tooth shifting means connected between said third arm means and said frame means.

2. A spring tooth harrow comprising means serving as a frame, a transversely extending rockshaft, means journaling said rockshaft on the forward portion of said frame means, a plurality of interconnected generally transverse tooth bars swingably mounted on said frame means rearwardly of said rockshaft, arm means on said tooth bars, ground working teeth on said tooth bars, angling connections between said rockshaft and said tooth bar arm means whereby rocking of said rockshaft serves to swing said tooth bars to different positions, arms fixed directly to and depending from said rockshaft, draft-transmitting means connected to the lower ends of said arms, other arm means fixed to and extending upwardly from said rockshaft and receiving said angling connections, whereby draft reaction tends to hold the teeth in the ground, and adjustable means acting between said rockshaft and said frame means to hold the rockshaft against rocking movement.

3. A spring tooth harrow comprising means serving as a frame, a plurality of interconnected generally transverse tooth bars swingably mounted on said frame means, spring teeth on said tooth bars and swingable relative to said frame means into and out of soil working position, a transverse rockshaft extending substantially from one side of said frame means to the other side thereof, arm means on said tooth bars, angling connections between said rockshaft and said tooth bar arm means whereby rocking of said rockshaft serves to swing said tooth bars to different positions, arm means on said rockshaft, draft applying means connected with said arm means, said arm means being constructed and arranged so that the reaction of forward draft tends to swing said rockshaft in a direction to lower said teeth relative to said frame means, and an adjustable connection between said frame means and said rockshaft for limiting the amount of tooth angling movement produced by said draft applying means.

4. A spring tooth harrow comprising a plurality of generally fore-and-aft extending rigid runner bars, a plurality of tooth bars pivoted at their ends to the associated runner bars, a transversely extending rockshaft journaled for rocking movement in the forward ends of said runner bars, arm means on said tooth bars, angling connections between said rockshaft and said arm means whereby rocking of said rockshaft serves to swing said tooth bars to different positions, arm means fixed in depending relation to said rockshaft, draft means connected to the lower portions of said depending arm means, arm means extending generally upwardly from said rockshaft, and angle adjusting means connected between said last mentioned arm means and certain of said runner bars.

5. A spring tooth harrow comprising a plurality of generally fore-and-aft extending rigid runner bars, a plurality of tooth bars pivoted at their ends to the associated runner bars, a plurality of teeth fixed to said tooth bars, said teeth having soil penetrating portions, a transversely extending rockshaft journaled for rocking movement in and supported on the forward ends of said runner bars, arm means on said tooth bars, angling connections between said rockshaft and said arm means whereby rocking of said rockshaft serves to swing said tooth bars to different positions, arm means fixed in depending relation to said rockshaft, means connected to act between said runner bars and said rockshaft to rock the latter to raise and lower said teeth relative to said runner bars, and draft means connected to the lower portions of said depending arm means.

6. A tractor propelled spring tooth harrow comprising a plurality of generally fore-and-aft extending rigid runner bars, a plurality of tooth bars pivoted at their ends to the associated runner bars rearwardly of the forward ends thereof, a pair of runner bars being disposed in side by side relation in the central part of the harrow, a transversely extending rockshaft journaled for rocking movement in and supported on the forward ends of said runner bars, upwardly extending arms fixed to each of said tooth bars in generally fore-and-aft alignment, upwardly extending arms fixed to said rockshaft and spaced laterally thereon generally in alignment with said tooth bar arms, link means interconnecting said arms, whereby rocking of said rockshaft serves to rock said tooth bars to change the angle of the teeth thereon, a generally fore and aft extending member supported on said center bars, and tractor power operated means connected between said fore-and-aft extending member and said rockshaft for rocking the latter.

7. A spring tooth harrow comprising a plurality of generally fore-and-aft extending rigid runner bars, including a pair of center runner bars and runner bars laterally outwardly thereof, said center bars being disposed adjacent one another, a plurality of tooth bars, means pivotally connecting said tooth bars at their ends to the associated runner bars, a transversely extending rockshaft journaled for rocking movement on the forward ends of said runner bars, arm means fixed to said tooth bars, angling connections between said rockshaft and said arm means whereby rocking of said rockshaft serves to swing said tooth bars to different positions, a center channel member disposed above said center runner bars and having flanges apertured to receive the pivot means connecting the associated tooth bars to the center runner bars, and means acting between said center runner bar and said rockshaft and said center channel member for rocking said rockshaft and said tooth bars.

8. A spring tooth harrow comprising a plurality of generally fore-and-aft extending rigid runner bars, including a pair of center runner bars and runner bars laterally outwardly thereof, apertured brackets fixed to the forward ends of said runner bars, a plurality of tooth bars pivoted at their ends to the associated runner bars, a transversely extending rockshaft journaled for rocking movement in the apertured portions of said brackets whereby said rockshaft is supported on said runner bars, arm means on said tooth bars, angling connections between said rockshaft and said arm means whereby rocking of said rockshaft serves to swing said tooth bars to different positions, an arm fixed to the rockshaft between the apertured brackets secured to said center runner bars, a fore and aft extending member fixed at its forward end to said last mentioned brackets and connected rearwardly thereof with and supported on said center runner bars, and power operated means connected between said rockshaft arm and said fore and aft extending member for rocking said rockshaft and raising and lowering said teeth.

9. A spring tooth harrow comprising a plurality of pairs of generally fore-and-aft extending rigid runner bars, a plurality of tooth bars pivoted at their ends to the associated runner bars of said pairs of bars, a transversely extending rockshaft journaled for rocking movement on the forward ends of said runner bars, angling connections between said rockshaft and said tooth bars whereby rocking of said rockshaft serves to swing said tooth bars to different positions, said angling connections including an arm fixed to each tooth bar, a generally fore and aft extending link member connecting the arms on the tooth bars of each pair of runner bars, a plurality of generally vertical members fixed to said rockshaft, each having an upper portion disposed in line with and connected to the associated link member, each vertical member extending below said rockshaft, and draft means connected to the lower ends of all of said generally vertical members.

10. A spring tooth harrow comprising a plurality of pairs of generally fore-and-aft extending rigid runner bars, a plurality of tooth bars pivoted at their ends to the associated runner bars of said pairs of bars, a transversely extending rockshaft journaled for rocking movement on the forward ends of said runner bars, generally vertical arms, each fixed intermediate its ends to said rockshaft, an angling connection between the upper end of each vertical arm and the associated tooth bars, and hitch means connected to the lower ends of all of said vertical arms.

References Cited in the file of this patent
UNITED STATES PATENTS

| | | |
|---|---|---|
| 1,628,799 | Nordstog | May 17, 1927 |
| 1,703,051 | Altgelt | Feb. 19, 1929 |
| 1,932,450 | Dyrr | Oct. 31, 1933 |
| 2,354,850 | Cook | Aug. 1, 1944 |
| 2,755,720 | Markel | July 24, 1956 |